United States Patent
Kubota et al.

(10) Patent No.: US 7,239,356 B2
(45) Date of Patent: Jul. 3, 2007

(54) BROADCAST RECEIVER FOR DISPLAYING VIDEO INFORMATION OF A PROGRAM TRANSMITTED BY BROADCAST WAVES

(75) Inventors: Hidetsugu Kubota, Saitama (JP); Rie Yamashita, Saitama (JP); Takamasa Yamaguchi, Saitama (JP); Hitoshi Sato, Saitama (JP); Yukari Mizumura, Saitama (JP); Toshiyuki Murata, Saitama (JP)

(73) Assignee: Pioneer Corporation, Tokyo (JP)

( * ) Notice: Subject to any disclaimer, the term of this patent is extended or adjusted under 35 U.S.C. 154(b) by 467 days.

(21) Appl. No.: 10/456,557

(22) Filed: Jun. 9, 2003

(65) Prior Publication Data

US 2004/0027485 A1 Feb. 12, 2004

(30) Foreign Application Priority Data

Aug. 8, 2002 (JP) ............................ P2002-230702

(51) Int. Cl.
*H04N 5/44* (2006.01)
*H04N 5/445* (2006.01)

(52) U.S. Cl. ...................... 348/564; 348/731; 348/553; 725/38; 725/39

(58) Field of Classification Search ................ 348/553, 348/564, 563, 565, 555, 725, 729; 725/38, 725/39, 40, 50, 56, 58
See application file for complete search history.

(56) References Cited

U.S. PATENT DOCUMENTS

| | | | |
|---|---|---|---|
| 5,559,550 A | 9/1996 | Mankovitz | |
| 5,585,838 A * | 12/1996 | Lawler et al. | 725/54 |
| 5,734,444 A | 3/1998 | Yoshinobu | |
| 5,917,481 A * | 6/1999 | Rzeszewski et al. | 715/721 |
| 6,115,080 A * | 9/2000 | Reitmeier | 348/731 |
| 6,243,142 B1 * | 6/2001 | Mugura et al. | 348/564 |
| 6,388,714 B1 * | 5/2002 | Schein et al. | 348/563 |
| 6,400,406 B1 * | 6/2002 | Kim | 348/460 |
| 6,536,041 B1 * | 3/2003 | Knudson et al. | 725/39 |
| 6,606,748 B1 * | 8/2003 | Tomioka et al. | 725/50 |
| 6,731,345 B2 * | 5/2004 | Lee | 348/553 |
| 6,807,677 B1 * | 10/2004 | Lee | 725/58 |
| 6,809,775 B2 * | 10/2004 | Yule | 348/553 |
| 6,978,471 B1 * | 12/2005 | Klopfenstein | 725/50 |
| 6,980,257 B2 * | 12/2005 | Fairhurst et al. | 348/589 |

FOREIGN PATENT DOCUMENTS

EP 1 061 742 A2 12/2000
WO WO 00/05886 A1 2/2000

* cited by examiner

*Primary Examiner*—David Ometz
*Assistant Examiner*—Jean W. Désir
(74) *Attorney, Agent, or Firm*—Sughrue Mion, PLLC

(57) ABSTRACT

A broadcast receiver has a GPS reception section for clocking, a TV tuner for receiving a broadcast wave of TV broadcast, and a display for displaying video information of a program transmitted by a broadcast wave, and displays video information of a plurality of programs received on a single screen of the display at the same time every hour on the hour. Accordingly, the user (viewer) can check the program contents of channels that can be received at the time of day.

7 Claims, 3 Drawing Sheets

BROADCAST RECEIVER FOR DISPLAYING VIDEO INFORMATION OF A PROGRAM TRANSMITTED BY BROADCAST WAVES

CROSS REFERENCE OF RELATED APPLICATION

This application is based on and claims priority with respect to Japanese Patent Application No. 2002-230702 filed on Aug. 8, 2002, the entire content of which is incorporated herein by reference.

BACKGROUND OF THE INVENTION

1. Field of the Invention

This invention relates to a broadcast receiver for displaying video information of a program transmitted by broadcast waves.

2. Description of the Related Art

A broadcast system, represented by a television broadcast system, made up of a broadcast station for transmitting video information and audio information for each program by broadcast waves of ground waves or satellite waves and a terminal receiver for receiving the broadcast waves through an antenna, thereby demodulating the transmitted video information and audio information and producing display output and audio output is extremely known at present.

In such a broadcast system, often the contents of the broadcast programs transmitted by the broadcast station are switched on the hour (0:00, 1:00, etc.,).

However, in recent years, the trends of multichannels and multiprograms have been going to move and the number of broadcast programs at the same time of day is extremely large. Thus, it is almost impossible for the viewer to keep all broadcast programs in mind. Thus, if the viewer does not keep a program guide introducing programs on hand, the viewer needs to switch the programs (channels) displayed on the screen in order on his or her own to check what programs are broadcast at the time of day; it is a burdensome procedure.

SUMMARY OF THE INVENTION

It is an object of the invention to eliminate the inconvenience of requiring such a burdensome procedure.

To the end, according to the invention as claimed in claim 1, there is provided a broadcast receiver comprising clock means for clocking, reception means for receiving a broadcast wave, and display means for displaying video information of a program transmitted by a broadcast wave, characterized in that video information of a plurality of programs received is displayed on a single screen of the display means at the same time at a predetermined time of day.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Referring now to the accompanying drawings, there is shown a preferred embodiment of a broadcast receiver according to the invention.

Figure 1:
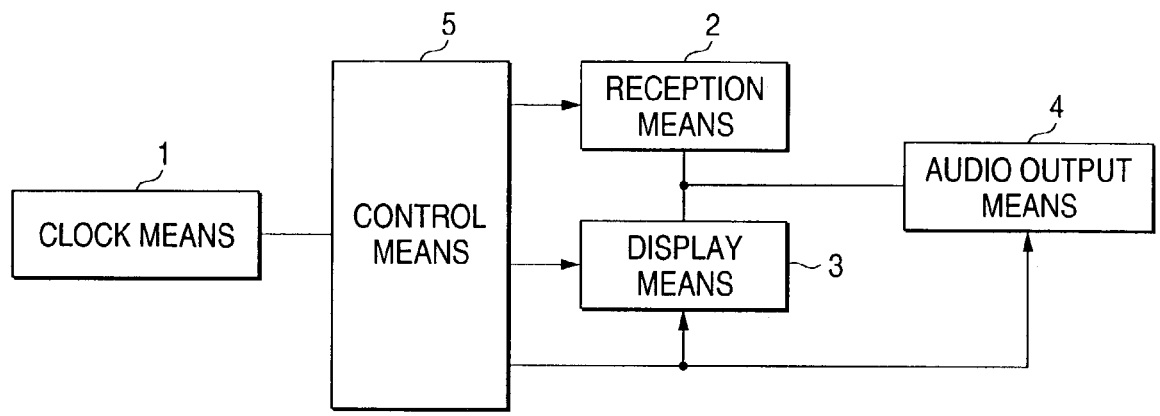
FIG. 1 is a block diagram to show an embodiment of a broadcast receiver according to the invention.

FIG. 1 is a block diagram to show an embodiment of a broadcast receiver according to the invention. In the figure, numeral 1 denotes clock means for clocking and outputting the time-of-day information. Numeral 2 denotes reception means for receiving broadcast waves transmitted from a broadcast station through an antenna. The reception means 2 has a demodulation section for demodulating various pieces of information contained in the received broadcast waves, such as video information and audio information, and outputs various pieces of information demodulated. Numeral 3 denotes display means for processing the video information demodulated by the reception means 2 and displaying the video information so that the viewer can see the video information. Numeral 4 denotes audio output means for outputting the audio information demodulated by the reception means 2. Numeral 5 denotes control means for inputting the time-of-day information from the clock means 1 and outputting control signals for controlling the means to the means.

The operation of the broadcast receiver made up of the means is as follows: The control means 5 receives the time-of-day information output from the clock means 1 and determines whether or not the time-of-day information indicates a predetermined time of day. The predetermined time of day is, for example, every hour on the hour, such as 7:00 or 8:00.

When the control means 5 detects the time of day reaching the predetermined time of day based on the input time-of-day information, the control means 5 starts reception control of broadcast waves by the reception means 2, display control of the display means 3, and audio output control of the audio output means 4. As control of the reception means 2, a plurality of broadcast waves are received in order. Video information and audio information of each of programs transmitted by the broadcast waves are demodulated and are output to the display means 3 and the audio output means 4 respectively.

The display means 3 displays the demodulated video information of the programs in order on the same screen of the display means 3. The audio output means 4 outputs the demodulated audio information in synchronization with the display timing of each program.

According to the described configuration, when the predetermined time of day is reached, the broadcast receiver according to the invention displays the video information of a plurality programs that can be viewed at the time of day at the same time on the screen of the display means 3. Therefore, the viewer can immediately keep track of what programs are broadcast and can be viewed at the point in time without holding a program guide or the like.

EXAMPLE

A more specific example of the embodiment will be discussed with reference to FIGS. 2 to 4.

Figure 2:
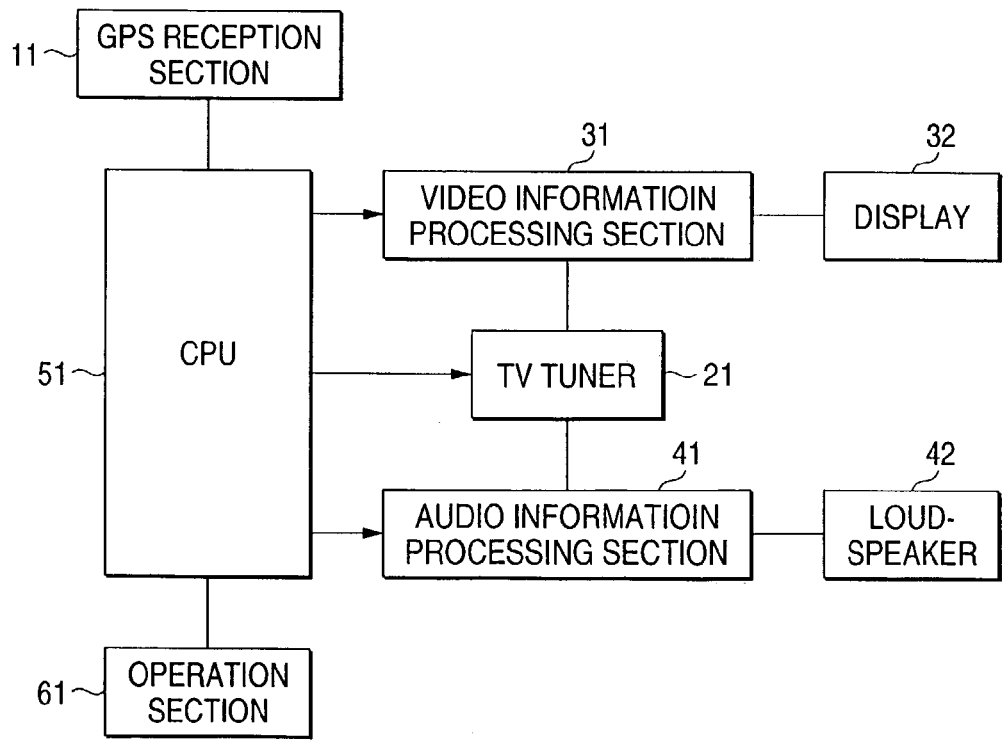
FIG. 2 is a block diagram according to an example of the invention.
Figure 3:
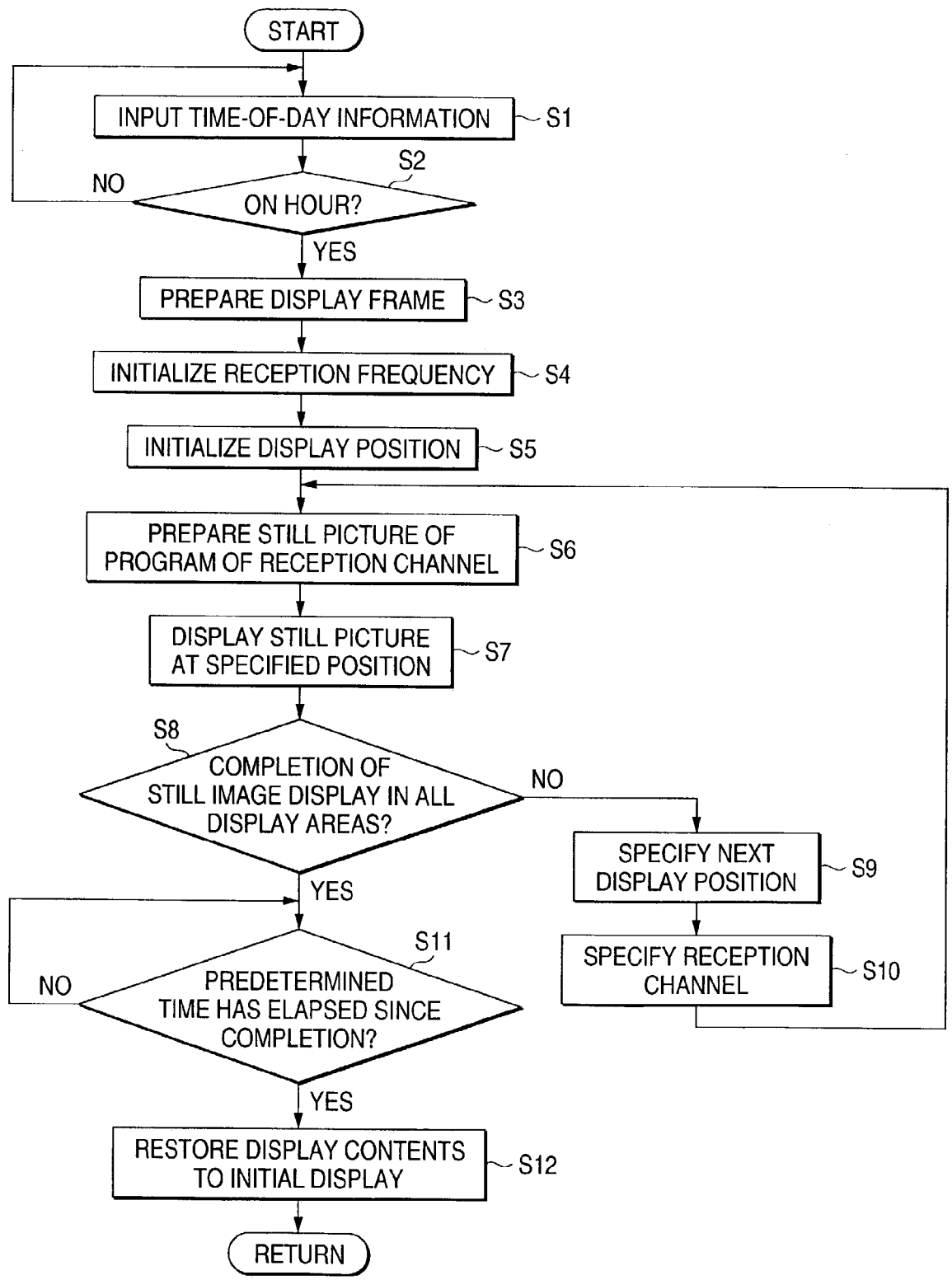
FIG. 3 is a flowchart according to the example of the invention.

FIG. 2 is a block diagram to show the example. FIG. 3 is a flowchart to show the operation of the example. FIGS. 4A to 4D are drawings to show display examples.

In FIG. 2, numeral 11 denotes a GPS reception section functioning as clock means. The GPS reception section 11 is a known GPS reception section made up of a GPS antenna for receiving a GPS signal transmitted from a GPS satellite, a GPS signal decoder for demodulating the received GPS signal, and the like. The GPS signal received at the GPS reception section 11 contains time-of-day information. Therefore, the GPS reception section 11 can function as clock means for clocking the precise current time of day using the time-of-day information.

Numeral 21 denotes a TV tuner as reception means for receiving broadcast waves. When the viewer selects a channel through an operation section 61, the TV tuner 21 sets the reception frequency to the selected channel frequency to receive broadcast waves and demodulates various pieces of information such as video information and audio information from the received broadcast waves. When the reception frequencies are switched in order under the control of a CPU 51, the TV tuner 21 receives the broadcast waves of a plurality of channel frequencies in response to the switching control and demodulates various pieces of information such as video information and audio information in a similar manner to that described above.

Numeral 31 denotes a video information processing section for processing the video information input from the TV tuner 21 and outputting the video information to a display 32 under the control of the CPU 51. The video information processing section 31 and the display 32 function as display means. The video information processing section 31 comprises a known multiscreen preparation circuit for laying out and displaying display information of a plurality of programs input from the TV tuner 21 on the display 32. The multiscreen preparation circuit forms a display frame consisting of a plurality of display areas to display the display information of a plurality of programs separately, as shown in FIG. 4B. Further, the display information of each of the programs input from the TV tuner 21 is displayed in each display area, as shown in FIGS. 4C and 4D.

Numeral 41 denotes an audio information processing section for making adjustment so that output of the audio information input from the TV tuner 21 to a loudspeaker 42 is synchronized with display of the video information of the program on the display 32 and muting after the expiration of a predetermined time from the display completion of the video information of the received program under the control of the CPU 51. The audio information processing section 41 and the loudspeaker 42 function as audio output means.

Next, the operation control in the example will be discussed based on the flowchart of FIG. 3 and the display examples of the display 32 shown in FIG. 4.

Figure 4A:
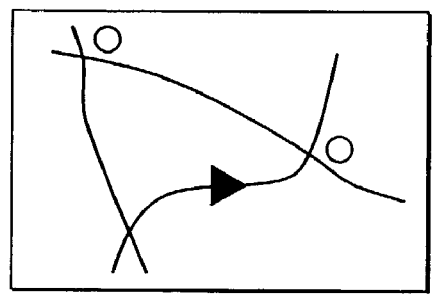
FIGS. 4A to 4D are drawings to show display examples according to the example of the invention.
Figure 4B:
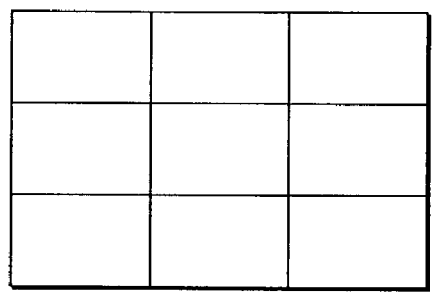
Figure 4C:
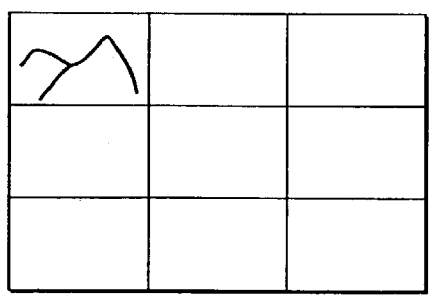
Figure 4D:
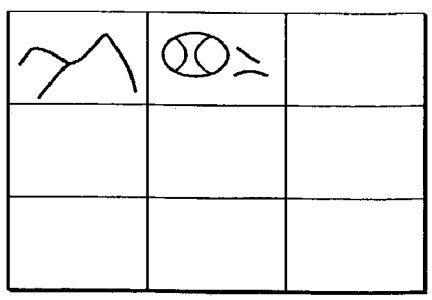

If the broadcast receiver shown in the example is adopted as an integral unit with an in-car navigation system, a map is displayed on the display as shown in FIG. 4A in the normal use mode. At this time, the GPS reception section 11 as the clock means described early also serves as current position measurement means for measuring the current position of the vehicle.

To begin with, when the broadcast receiver starts to operate, the CPU 51 inputs time-of-day information output by the GPS reception section 11 (step S1). The CPU 51 determines whether or not the current time is on the hour based on the input time-of-day information (step S2). If the CPU 51 determines that the current time is not on the hour (No at step S2), the CPU 51 returns to step S1 and repeats processing until determining that the current time is on the hour (Yes at step S2). Meanwhile, the screen of the display is not changed and display of the map is continued.

If the CPU 51 determines that the current time is on the hour (Yes at step S2), the CPU 51 controls the video information processing section 31 first for erasing the displayed map. Subsequently, the CPU 51 forms a display frame by the multiscreen preparation circuit in the video information processing section 31 as shown in FIG. 4B and outputs the display frame to the display 32 (step S3).

Subsequently, the CPU 51 controls the TV tuner 21 first for setting the reception frequency to the frequency of the channel to be first received (step S4). Further, the CPU 51 controls the video information processing section 31 for determining and setting the display area position for first displaying video information in the display frame prepared by the multiscreen preparation circuit (step S5). In the example, the upper-left display area in the display frame shown in FIG. 4B is the first display position.

Next, the video information processing section 31 prepares a still picture from the display information of the program demodulated from the transmission wave of the frequency set at step S4 by the TV tuner 21 (step S6). The video information processing section 31 displays the still picture in the display area set at step S5 as shown in FIG. 4C (step S7). At the display timing of the still picture, audio information of the program is output from the loudspeaker 42.

Next, the CPU 51 determines whether or not still pictures are displayed in all display areas of the display frame prepared by the multiscreen preparation circuit (step S8). If the CPU 51 determines that still pictures are not displayed in all display areas (No at step S8), the CPU 51 goes to step S9 and determines and sets the display area position to display video information of the program on the channel to be next received (step S9). In the example, the upper-center display area in the display frame shown in FIG. 4B is set as the second display position.

The CPU 51 controls the TV tuner 21 for setting the frequency corresponding to the channel to be next received as the reception frequency (step S10) and the video information processing section 31 again prepares a still picture from the display information demodulated from the transmission wave of the frequency (step S6) and displays the still picture at the upper-center display area position set at step S9 as shown in FIG. 4D (step S7). At the display timing of the still picture, audio information of the program is output from the loudspeaker 42 as described early.

Steps S6 to S10 are repeated until it is determined at step S8 that still pictures are displayed in all display areas of the display frame prepared by the multiscreen preparation circuit. As a result, the still pictures of the programs are displayed on the display 32 at the same time in all display areas of the display frame prepared by the multiscreen preparation circuit, and at the display timing of each still picture, audio information of the corresponding program is output from the loudspeaker 42.

If it is determined at step S8 that still pictures are displayed in all display areas of the display frame prepared by the multiscreen preparation circuit (Yes at step S8), whether or not a predetermined time has elapsed since the completion of displaying the still pictures in all display areas of the display frame is determined (step S11). Here, the determination is repeated until the predetermined time has elapsed.

If it is determined at step S11 that the predetermined time has elapsed (Yes), the display frame and the sill images are erased and the display contents are restored to the initial display contents, namely, the map display in the example (step S12) and again the process is repeated starting at step S1.

What rule the channel to be first received, set at step S4 and the channel to be next received, set at step S10 are to be determined according to is an arbitrary determination item when the example of the invention is embodied. As an example of the rule, the following is possible: The channel to be first received, set at step S4 is set to the channel assigned the smallest channel number among the channels that can be received in the region using the broadcast receiver and the channel to be next received, set at step S10 is set to the channel assigned the second smallest channel number and later the channel number is increased gradually among the channels that can be received in the region using the broadcast receiver.

The number of the display frames each consisting of a plurality of display areas prepared by the multiscreen preparation circuit and the size of each display frame are also arbitrary determination items when the example of the invention is embodied.

Further, in the example, the predetermined time of day at which display of multiscreen is started is every hour on the hour, but the invention is not limited to the time of day. For example, the time of day at which a plurality of programs are started is determined based on program guide information (known EPG (electronic program guide) technique) multiplexed and contained in broadcast waves and is adopted as the predetermined time of day and the channels of the started programs are received in sequence, whereby the viewer can check the started program contents from the beginning of each program.

The predetermined time of day is every hour on the hour, so that the viewer can check the program contents every hour on the hour. The viewer may previously store any desired time of day in the broadcast receiver for adopting the desired time of day as the predetermined time of day.

In the example, the GPS reception section 11 capable of precisely clocking is adopted as the clock means, but the invention is not limited to the mode. The broadcast receiver may contain its own clock that can be calibrated by the GPS reception section 11, needless to say.

The video information displayed on the display 32 at the multiscreen display time provides still pictures. However, for example, a plurality of TV tuners 21 can also be provided so that the video information displayed on the display 32 at the multiscreen display time provides moving pictures.

As described above, in the example of the broadcast receiver according to the invention, the broadcast receiver comprises the GPS reception section 11 for clocking, the TV tuner 21 for receiving broadcast waves, and the display 32 for displaying video information of a program transmitted by broadcast waves, and displays video information of a plurality of programs received on a single screen of the display 32 at the same time every hour on the hour, so that the viewer can check the program contents of channels that can be received at the time of day.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A broadcast receiver comprising:
a clock section for clocking;
a reception section for receiving a broadcast wave,
a display section for displaying video information of a program transmitted by a broadcast wave, and
a processing unit for controlling the reception section to set a first reception frequency, and controlling a video information processing section to determine and set a first display area and a second display area for displaying the video information in a display frame prepared by a multiscreen preparation circuit;
wherein the video information processing section prepares a first still picture from the video information of a program demodulated from a broadcast wave of the first reception frequency and displays the first still picture in the first display area of the display frame,
wherein the video information processing section prepares a second still picture from video information of a program demodulated from a broadcast wave of a second reception frequency set by the reception section controlled by the processing unit and displays the second still picture in the second display area of the display frame; and
wherein video information of a plurality of programs received is displayed on a single screen of said display section at the same time at a predetermined time of day, in response to detecting the predetermined time of day.

2. The broadcast receiver as claimed in claim 1 wherein the predetermined time of day is every hour on the hour.

3. The broadcast receiver as claimed in claim 1 wherein the video information of a plurality of programs received is displayed on a single screen of said display section at the same time every hour on the hour.

4. The broadcast receiver as claimed in claim 1 wherein the time of day is displayed on said display section.

5. The broadcast receiver as claimed in claim 1 wherein audio information of the programs demodulated from the broadcast waves of the first and second reception frequencies are output from a loudspeaker at a display timing of the respective first and second still pictures.

6. A method, of displaying information on a display, comprising:
determining a current time of day;
comparing the current time of day to a predetermined time of day; and
when the comparison indicates that the predetermined time of day is the current time of day, controlling the display by:
preparing a display frame and setting a first display area and a second display area for displaying video information of programs transmitted by broadcast waves;
preparing a first still picture from video information of a program demodulated from a broadcast wave of a first reception frequency;
displaying the first still picture in the first display area of the display frame;
preparing a second still picture from video information of a program demodulated from a broadcast wave of a second reception frequency; and
displaying the second still picture in the second display area of the display frame.

7. The method as claimed in claim 6, wherein audio information of the programs demodulated from the broadcast waves of the first and second reception frequencies are output from a loudspeaker at a display timing of the respective first and second still pictures.

* * * * *